United States Patent [19]

Snider

[11] Patent Number: 4,522,281

[45] Date of Patent: Jun. 11, 1985

[54] MOTORIZED COLLAPSIBLE GOLF CART

[76] Inventor: William R. Snider, 3238 St. Charles Dr., Steubenville, Ohio 43852

[21] Appl. No.: 486,778

[22] Filed: Apr. 20, 1983

[51] Int. Cl.³ .............................................. B62D 55/16
[52] U.S. Cl. .............................. 180/208; 280/DIG. 5
[58] Field of Search ................. 180/208; 280/DIG. 5; 206/315.6

[56] References Cited

U.S. PATENT DOCUMENTS

| | | | |
|---|---|---|---|
| 2,919,758 | 1/1960 | Newton et al. | 180/208 X |
| 3,043,389 | 7/1962 | Steinberg | 180/208 |
| 3,155,185 | 11/1964 | Allen et al. | 180/208 X |
| 3,205,963 | 9/1965 | Tinker | 180/19 |
| 3,232,367 | 2/1966 | York | 180/19 |
| 3,265,106 | 8/1966 | Jarman | 206/315.6 |
| 3,407,892 | 10/1968 | Vosseller | 180/19 |
| 3,434,558 | 3/1969 | Allen | 180/208 |
| 3,527,314 | 9/1970 | Mistarz | 180/19 |
| 4,452,327 | 6/1984 | Mowat et al. | 280/DIG. 5 X |

Primary Examiner—Joseph F. Peters, Jr.
Assistant Examiner—Charles R. Watts
Attorney, Agent, or Firm—William H. Wright

[57] ABSTRACT

This invention relates to motorized golf carts in general, and more specifically to an articulated, personalized, collapsible golf cart that can be easily transported in a vehicle. In addition, this golf cart is further provided with power and braking functions segregated between the articulated sections, and a very low center of gravity, for improved handling and performance.

5 Claims, 8 Drawing Figures

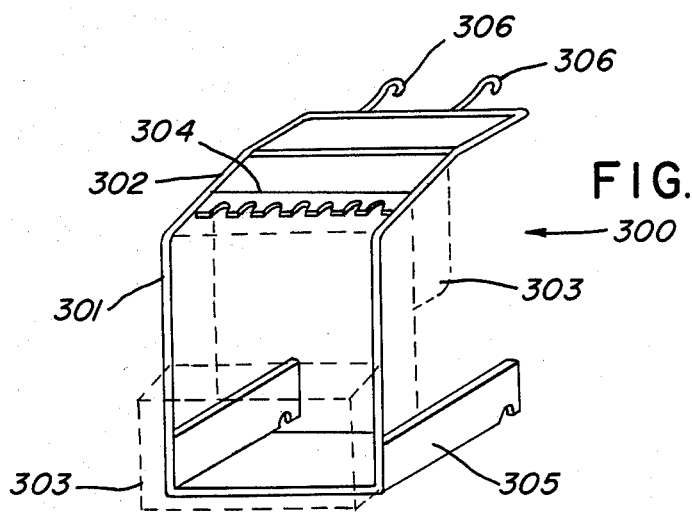
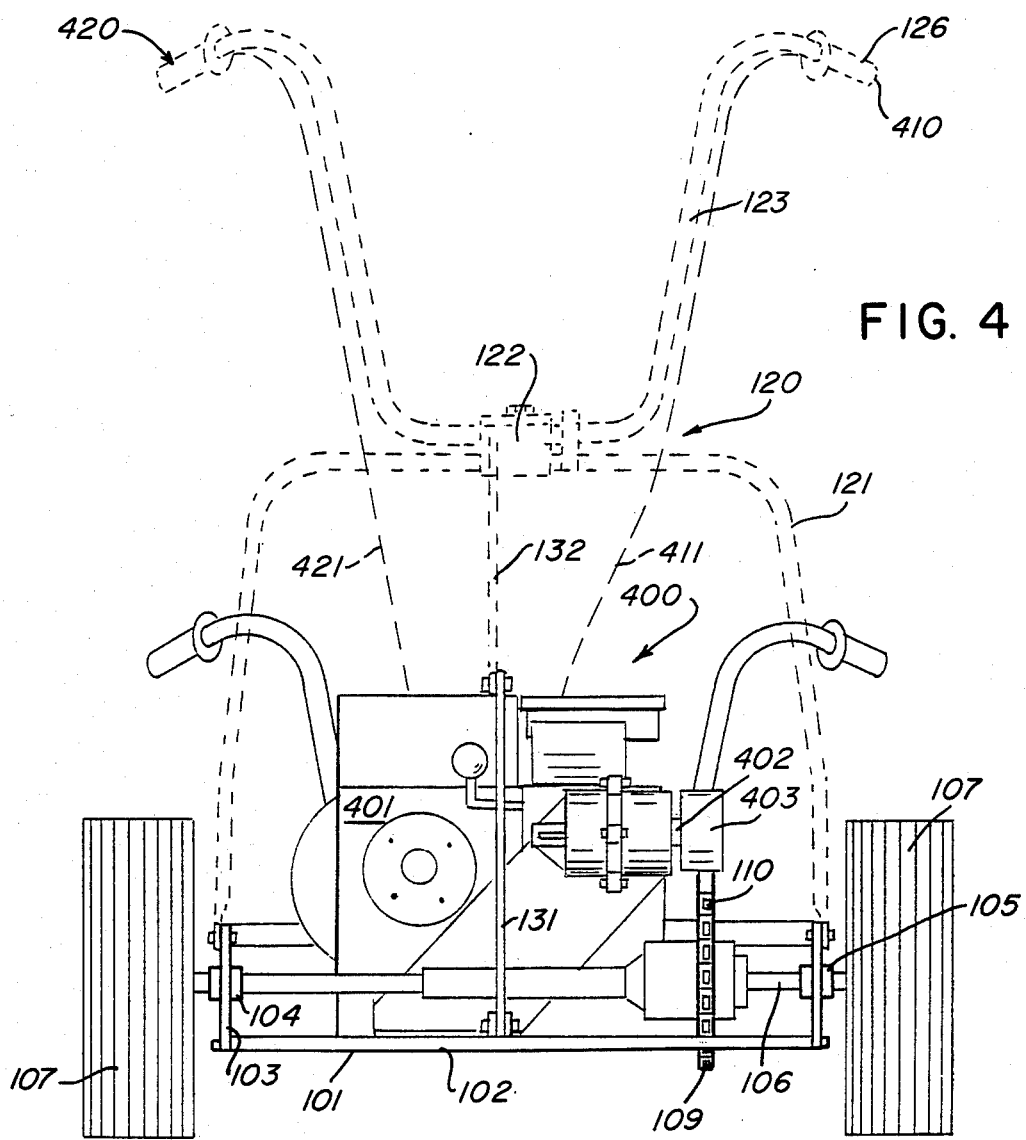

4,522,281

MOTORIZED COLLAPSIBLE GOLF CART

BACKGROUND OF THE INVENTION

The prior art is replete with relatively small and lightweight motorized, or self-propelled golf carts, that could conceivably be stored in the trunk of an automobile, as can be seen by reference to U.S. Pat. No's: 3,407,892; 3,527,314; 3,205,963 and 3,232,367.

While these patented devices are admittedly adequate for their intended purpose, they also share one or more of the following deficiencies: e.g.—instability, due to a high center of gravity; limited or no collapsibility; limited or straight line steering only; no independent braking; limited or no suspension means; and on-or-off operation only.

In addition to the above noted drawbacks, the prior art has failed to recognize, that if a motor can be utilized to propel the golf cart ahead of a person, it might as well be used to its full potential, and transport the person along with their golf bags.

Unfortunately, due to a lack of foresight, the prior art devices used to transport both the golfer and their equipment have followed the maxim that "bigger and bulkier are better." As a result, the occupant driven golf carts that have been developed are neither compact, collapsible, nor portable in the trunk of a vehicle.

The present invention addresses the shortcomings of the prior art, by providing a golf cart that has all of the advantages of the occupant driven golf carts, while retaining the compact configuration and portability of the self-propelled golf carts.

SUMMARY OF THE INVENTION

An object of this invention is to provide a safe, reliable, single occupant, motorized golf cart.

Another object of the present invention is to provide a collapsible occupant driven golf cart, that can be transported in an automobile trunk.

Still another object of the present invention is to combine the best features of a self-propelled golf cart, and an occupant driven golf cart, into a single device.

Yet another object of the present invention is to provide an articulated golf cart construction, having the power and braking function segregated between the articulated sections.

A further object of the present invention is to provide a low center of gravity, extremely stable, golf cart construction that will transport a single person and their golf culbs across uneven terrain, and up and down hills in a safe and expeditious manner.

A still further object of this invention is to provide a golf cart, wherein at least two of the major components can be nested during transportation and storage.

These and other objects, advantages, and novel features of the invention will become apparent, in light of the detailed description that follows, when considered in conjunction with the accompanying drawings.

BRIEF DESCRIPTION OF THE DRAWINGS

FIG. 4, is a front elevation of the wheeled power member.

FIG. 8, is a perspective view of the golf club retaining device.

DETAILED DESCRIPTION OF THE PREFERRED EMBODIMENT

Figure 1:
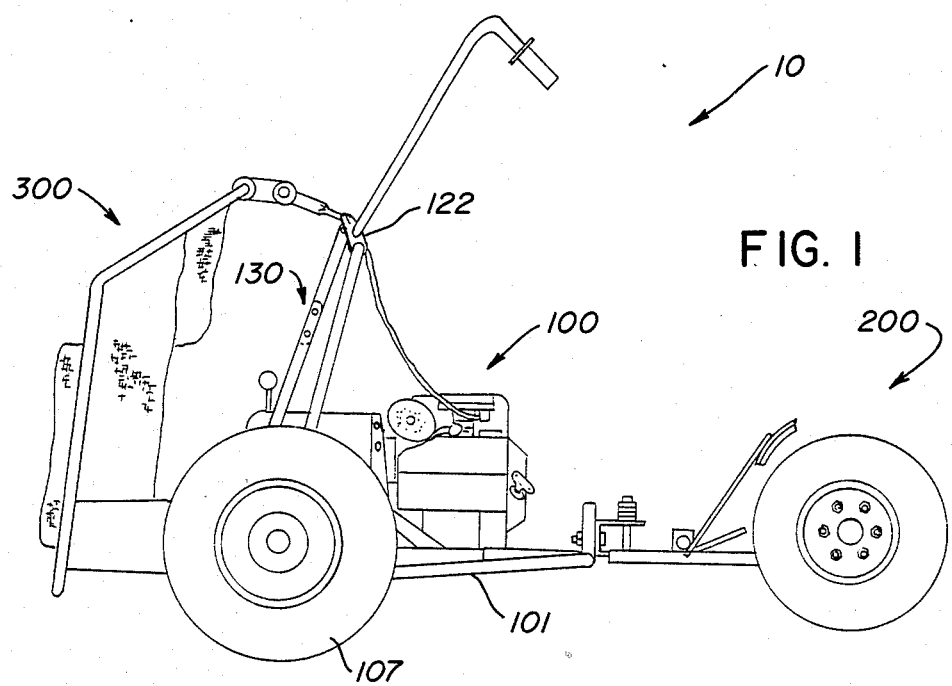
FIG. 1, is a side elevation of the three major components that comprise this invention, in their assembled relationship.
Figure 2:
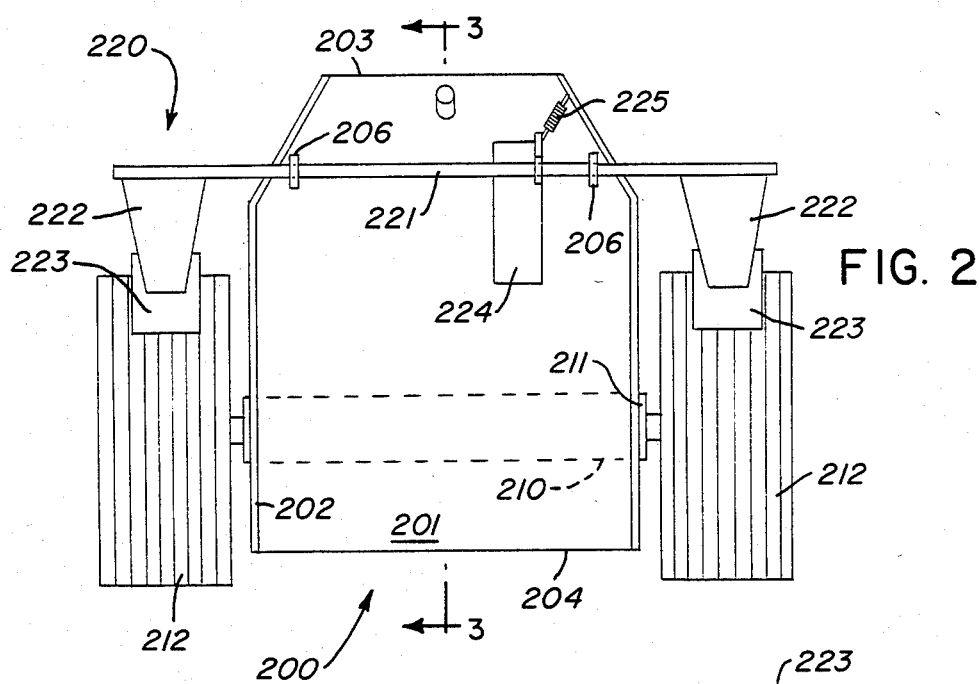
FIG. 2, is a top elevation of the wheeled platform member.
Figure 3:
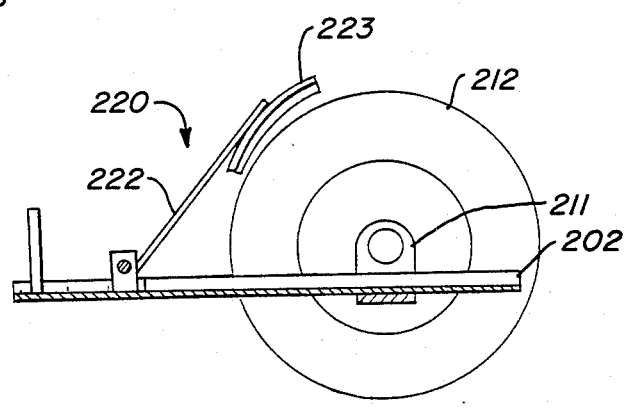
FIG. 3, is a cut-away side elevation of the wheeled platform member.

As can be seen by reference to the drawings, the personal golf cart that forms the basis of the present invention is designated generally as 10, and comprises a wheeled powered member 100, a wheeled platform member 200 and a detachable golf club retaining device 300.

The wheeled platform member 200, comprises a generally rectangular platform 201, having raised sides 202. The leading 203 and trailing 204 edges of the platform are flush with the platform surface, and the raised sides 202, converge in the vicinity of the leading edge 203. An elongated rod 205, having a threaded end, is disposed adjacent to, but spaced from, the leading edge 203, and projects vertically upward from the platform. In addition, a pair of apertured ears 206 are disposed on the platform, in the vicinity of the converging sides 202.

The platform is further provided with a wheel and axle arrangement proximate its trailing edge, comprising a generally U-shaped axle member 210, rigidly secured to the underside of the platform, whose outboard arms 211, extend a substantial distance above the upraised edges 202 of the platform. Each of the outboard arms 211 of the axle, are adapted to be connected to a respective wheel member 212, in any of a number of well recognized ways.

A brake mechanism 220 is disposed on the forward portion of the platform, and comprises an elongated rod 221, that is dimensioned to be rotatably received by the apertured ears 206. The elongated brake rod 221, extends beyond the sides of the platform, and is provided on each end with an arm 222, and brake shoe 223, which are rigidly attached thereto.

In addition, a brake pedal 224, is rigidly connected to the brake rod 221, proximate one of the platform edges, and a spring 225 is attached to the brake pedal, to bias the brake shoes out of engagement with the wheels 212.

The wheeled power member 100 comprises a generally heart shaped open tubular framework 101, having one or moe horizontally disposed support brackets extending between opposed sides of the framework for the purpose of rigidity and support. These support brackets form the bed of the wheeled power member 100, and are provided to support the power mechanism 400, that drives the articulated golf cart, and which will be described in more detail further on in the specification.

As can best be seen by reference to FIG. 4, the forward end 102 of the tubular framework is provided with a pair of bearing brackets 103, which comprise apertured flange members 104, which are rigidly secured to the tubular framework, and project vertically therefrom. Each of the flange members 104, is further provided with an axle bearing member 105, which is dimensioned to receive and rotatably support a drive axle 106.

The drive axle 106 is horizontally disposed above and across the forward end 102 of the tubular framework, and operatively connected on either end to a pair of drive wheels 107. In addition, the drive axle 106 is further provided with a differential and a chain drive sprocket 109, which operatively connects the drive axle 106 to the power mechanism 400, via a drive chain 110.

The power mechanism 400 comprises a small horsepower engine 401, having a horizontal output shaft 402, that is provided with another chain drive sprocket 403, on its outboard end. The chain sprocket 403 cooperates with the drive chain 110 to power the drive wheels 107, in a well recognized manner. The engine 401 may be either a gasoline or electrically powered motor; however, since the electrical type normally require heavy batteries, a gasoline engine of approximately 3HP is recommended for the preferred embodiment.

In order that the power mechanism 400 can be controlled by the operator, it is also provided with a standard clutch, transmission and drive pulley arrangement, that can be actuated from a remote location. It should be appreciated at this point, that a wide variety of power and control mechanisms could be employed to provide the motive power to the wheeled power member 100; and in order to practice this invention, it is only necessary that the motor have sufficient horsepower to propel the desired load, and also that the operation of the motor can be controlled from a remote location, for reasons that will be explained further on in the specification.

Figure 5:
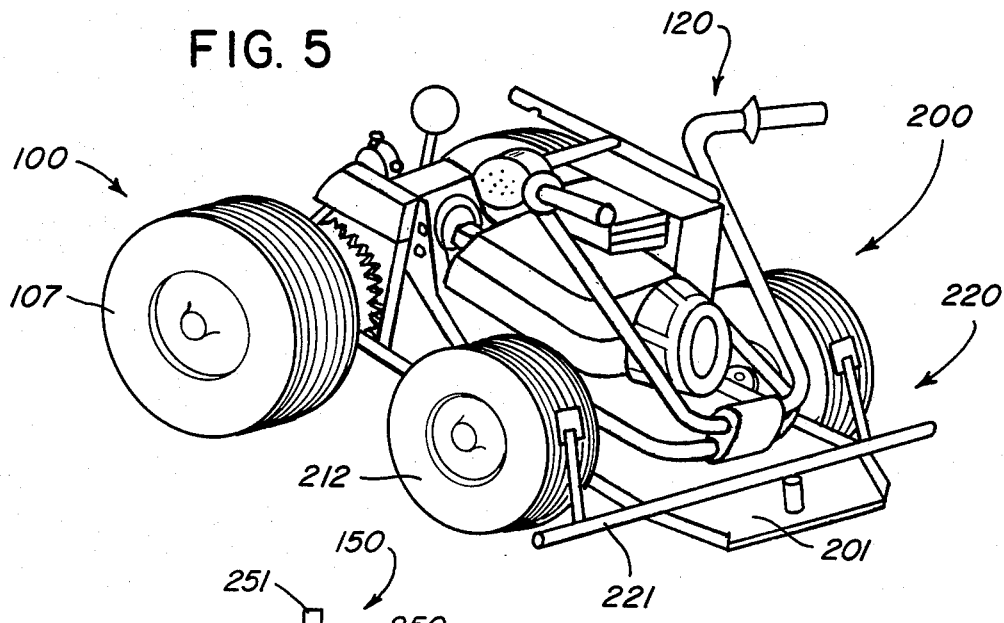
FIG. 5, is a side elevation view of the wheeled power and platform members in their collapsed and nested relationship.

As can best be seen by reference to FIGS. 4 and 5, the wheeled power member 100, is provided with a folding handle assembly designated generally as 120. This handle assembly 120 comprises an inverted generally U-shaped tubular lower portion 121, that is pivotally connected on its ends to the tubular framework 101. The lower portion 121, is dimensioned so that it may be pivoted from a nearly vertical position, to a nearly horizontal position, without coming into contact with any portion of the power mechanism 400.

The handle assembly 120, further comprises a handle bar bracket 122, that is rigidly secured to the top of the inverted U-shaped portion, and which is dimensioned to rotatably receive a generally V-shaped handle bar member 123. The handle bar bracket is also provided with a forwardly projecting apertured portion 124, and securing means 125, for locking the handle bar member 123 against relative rotation with respect thereto.

The handle bar member 123 is provided with rearwardly extending grip portions 124, and is dimensioned so that when the U-shaped lower portion is pivoted to the nearly horizontal position, the handle bar member may be rotated towards the front of the wheeled power member 100, without coming into contact with any portion of the power mechanism 400. This arrangement allows the wheeled power member to be collapsed down to a very compact size for the purpose of transporting it, to and from, the point of use.

In order to maintain the handle assembly 120 in a generally vertical position during use, a pivoted brace 130 is provided, which is connected on one end to the apertured portion 124 of the handle bar bracket 122, and on the other end to the front of the heart shaped tubular framework 101.

This brace 130 comprises a lower leg brace 131 and an upper leg brace 132. The upper leg brace 132 is provided with a slotted recess 133, proximate its free end, and is pivotally connected to one end of the lower leg brace 131, at a point proximate to, but spaced from, the slotted recess 133. The lower leg brace 131, is pivotally connected at its other end, to the front of the heart shaped tubular framework, and is further provided with a releasable locking means 134, that is dimensioned to cooperate with the slotted recess, to frictionally restrain the upper and lower leg braces from relative movement with respect to one another. The final connection of the upper leg brace 132 to the handle bar bracket 122 is accomplished via a releasable locking means 135, which extends through the apertured portion 124 of the handle bar bracket, and a suitably dimensioned aperture 136 in the upper leg brace 132.

This embodiment comprises a threaded bolt having a lock nut on one end, and a wing nut on the other end; however, any suitable releasable locking means could be employed to practice this invention. It is only necessary that the upper leg brace can be detached from the handle bar bracket, so that the respective components can be pivoted to their most compact configuration for storage.

Turning now to the control mechanism that governs the operation of the motor, it should be appreciated that as mentioned supra, a wide variety of different control mechanisms could be employed with this device. Since in the preferred embodiment, the transmission is provided with forward, neutral, and reverse gearing, it will be necessary to provide the device with a remote clutch control 410, and a remote throttle control 420. These controls are mounted on the rearwardly extending grip portions 126 of the handle bar member 123; and in the case of the throttle control 420, may actually be incorporated into the grip construction, in the form of a "twist throttle". Furthermore, in keeping with the collapsible nature of this device, it will be necessary to provide flexible connectors, such as cables 411, 421 between the controls 410, 420 and the clutch and throttle itself. The disposition of the controls on the handle grip portion, allows the operator to govern the speed and direction of the wheeled platform member.

Figure 7:
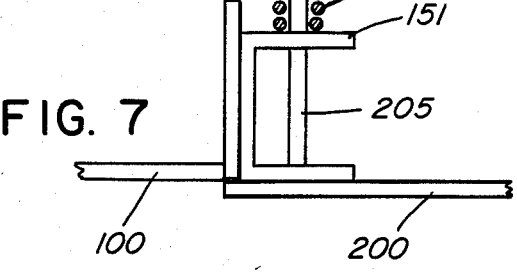
FIG. 7, is a detailed side view of the coupling assembly.
Figure 6:
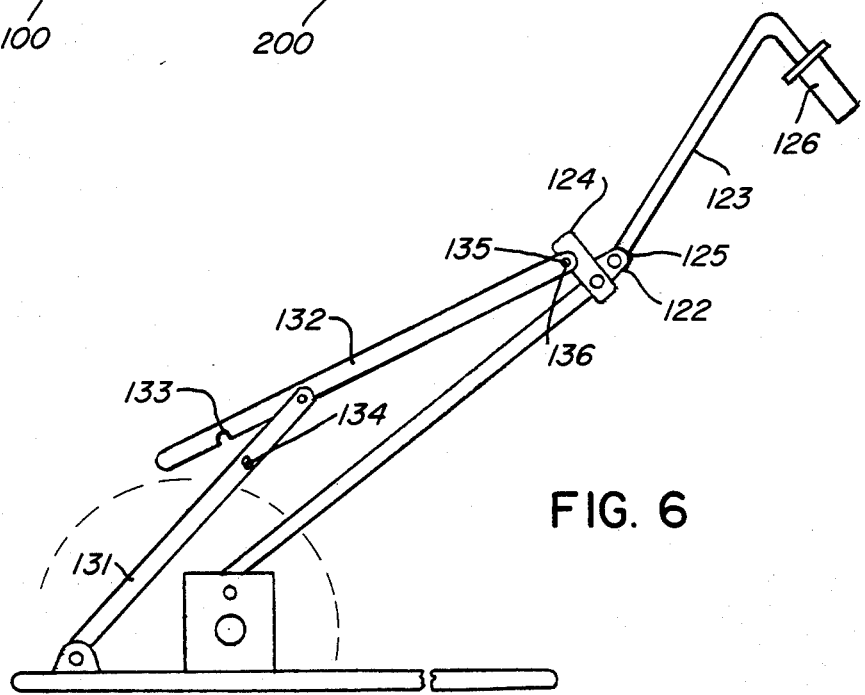
FIG. 6, is a detailed side view of the collapsible handle assembly.

As can best be seen by reference to FIG. 7, the connection between the wheeled power member 100, and the wheeled platform member 200, comprises a coupling member 150 in the form of a generally C-shaped coupling bracket 151, rigidly secured to the rearward end of the heart shaped tubular framework. The coupling bracket 151 is further provided with apertures in its upper and lower legs that are dimensioned to receive the elongated vertical rod 205, disposed on the leading edge of the wheeled platform member 200. The elongated rod 205 is dimensioned to project a substantial distance above the top of the coupling bracket 151 in their assembled relationship. The coupling of the wheeled power and platform members is completed by inserting a heavy duty helical spring 250 over the threaded end of the elongated rod 205, and attaching a threaded cap member 251 onto the threaded end of the rod, to place the helical spring into compression. This arrangement creates a universal coupling and torque arrester between the members 100 and 200. It should be noted that the helical spring 250 is solely in frictional contact with both the underside of the cap member 251 and the top of the coupling bracket 151. This arrangement, provides the least resistance to relative pivotal movement between the wheeled platform and power members, while still providing a spring suspension.

Another feature of novelty that is found in this invention, revolves around the nesting capability between the platform and power members, in their storage or transportation mode. As mentioned supra, the power member framework 101 is heart shaped, and has the narrow end of the heart shaped configuration pointing towards the rear of that member. The disposition of the brake mechanism 220 on the forward end of the platform member 200; therefore allows the rearward end of the platform member to accommodate that narrow portion of the power member, when the respective members are disassembled, and the platform member is rotated 180° and slid under the power member as illustrated in FIG. 5.

As can be seen by reference to FIG. 8, the golf club retaining device 300 comprises a generally rectangular tubular framework 301 having a rearwardly projection upper portion 302. A plurality of flexible receptacles 303, and a plurality of releasable golf club shaft engaging means 304, are disposed across the upper portion of the framework. The lower portion of the framework is provided with a rearwardly extending rigid receptacle 305, which is intended to receive and support the heads of the golf clubs, and a clamping means 306 extends rearwardly from the upper portion of the framework, to form a releasable connection between member 300 and the handle assembly 120 of the power member 100.

The assembly of the major components 100, 200 and 300 is accomplished by inserting the elongated vertical rod 205 of the platform member 200 through the apertures in the coupling bracket 151. The torque arresting spring 250 is inserted over the rod 205 and the cap member 251 is threaded into place. The lower portion 121 of the handle assembly is pivoted towards the front of the power member, and the handle bar member 123 is pivoted towards the rear of the power member. The pivoted brace 130 is pivoted and locked into the vertical position and the upper portion of the brace is connected to the handle bar bracket 122. The golf club retainer is then attached to the handle bar assembly, and the golf cart is ready for use.

It should be appreciated at this point, that a golf cart built in accordance with the above disclosed teachings will have; a very low center of gravity for stability; improved handling characteristics by virtue of the articulated connection between the wheeled members; a positive braking capability with the braking force applied directly to the rear wheels; and an extremely compact configuration during transportation or storage.

Having thereby disclosed the subject matter of this invention, it should be obvious that many substitutions, modifications and variations are possible in light of the teachings. It is therefore to be understood that the invention as taught and described is only to be limited to the extent of the breadth and scope of the appended claims.

What I claim is:

1. an improved golf cart construction comprising three major components, wherein:
    the first major component comprises; a wheeled platform member having a platform mounted above an axle; a brake machanism; and, an elongated rod mounted on the forward end of the platform;
    the second major component comprises; a wheeled power member, having an axle mounted above a tubular framework that provides a support surface for a power mechanism, wherein one end of the tubular framework is dimensioned to rest on the rear portion of the said platform when the first and second major components are disassembled; a folding handle assembly comprising a generally V-shaped handle bar member; wherein both the lower portion and the handle bar member are pivotable with respect to the said power mechanism; and, a coupling bracket adapted to connect the said first major component to the second major component, wherein the coupling bracket comprised a generally C-shaped apertured bracket mounted on the rear of the said tubular framework, and the apertures in the bracket are dimensioned to receive the elongated rod on the wheeled platform member and one end of the elongated rod is threaded and provided with a helical spring and cap member, to complete the connection between the first and second major components; and
    the third major component comprises a golf club retaining device having a plurality of flexible receptacles and releasable golf club shaft engaging means disposed across a generally rectangular tubular framework, and clamping means for releasably securing said third major component to the second major component.

2. An improved golf cart construction as in claim 1; wherein,
    the handle assembly is further provided with a pivoted brace, that is pivotally connected on one end to the tubular framework, and releasably connected on the other end to the connection between the handle bar member and the said lower portion.

3. An improved golf cart construction as in claim 2; wherein,
    the golf club retaining device, further comprises a rigid rearwardly extending receptacle connected to the lower portion of the rectangular framework, and adapted to receive and support the heads of the golf clubs.

4. An improved golf cart construction as in claim 3; wherein, the power mechanism comprises:
    a motor, transmission and clutch for driving the wheels of the power member in response to the actuation of remote control mechanisms that are mounted on the handle bar member.

5. An improved golf cart construction as in claim 4; wherein, the brake mechanism comprises:
    brake pads rigidly connected to a brake rod, that is rotatably mounted on the front of said platform, and rigidly connected to a brake pedal; wherein, the brake pads are disposed adjacent to the wheels of the platform member, and normally spring biased away from contact therewith.

* * * * *